US008209409B2

(12) United States Patent
Mopur et al.

(10) Patent No.: US 8,209,409 B2
(45) Date of Patent: Jun. 26, 2012

(54) DIAGNOSIS OF A STORAGE AREA NETWORK

(75) Inventors: Satish Kumar Mopur, Bangalore (IN); Unnikrishnan Ponnan Katangot, Bangalore (IN); Sathya Prakash Dhanabal, Bangalore (IN); Mukesh Gupta, Karnataka (IN); Vivek Mehrotra, Bangalore (IN); Karthigeyan Kasthurirengan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 12/099,685

(22) Filed: Apr. 8, 2008

(65) Prior Publication Data

US 2008/0250042 A1 Oct. 9, 2008

(30) Foreign Application Priority Data

Apr. 9, 2007 (IN) .............................. 747/CHE/2007

(51) Int. Cl.
*G06F 15/173* (2006.01)

(52) U.S. Cl. ...................................................... 709/223

(58) Field of Classification Search ........... 709/220–226
See application file for complete search history.

(56) References Cited

U.S. PATENT DOCUMENTS

| 5,592,610 | A | * | 1/1997 | Chittor .............................. 714/4 |
| 5,900,007 | A | * | 5/1999 | Nunnelley et al. ................ 711/4 |
| 6,801,992 | B2 | * | 10/2004 | Gajjar et al. .................. 711/173 |
| 7,065,616 | B2 | * | 6/2006 | Gajjar et al. .................. 711/154 |
| 7,328,260 | B1 | * | 2/2008 | Muthiyan et al. ............. 709/224 |
| 7,343,410 | B2 | * | 3/2008 | Mercier et al. ................ 709/225 |
| 7,401,338 | B1 | * | 7/2008 | Bowen et al. ................. 719/328 |
| 7,523,341 | B2 | * | 4/2009 | Hufferd et al. ................ 714/6.3 |
| 7,617,320 | B2 | * | 11/2009 | Alon et al. .................... 709/229 |
| 2002/0059149 | A1 | * | 5/2002 | Pappalardo et al. ............. 706/1 |
| 2006/0271677 | A1 | * | 11/2006 | Mercier ........................ 709/224 |

OTHER PUBLICATIONS

Wright, Gary, Quality of Connection for the Enterprise SAN, Jan. 1, 2000, Computer Technology Review, pp. 1-11.*

* cited by examiner

*Primary Examiner* — Wing Chan
*Assistant Examiner* — Alicia Baturay

(57) ABSTRACT

A method of determining a state of a Storage Area Network SAN is provided comprising analyzing data collected from components in the SAN, calculating a redundancy level of the SAN based on the analyzed data, and determining the state of the SAN based on the calculated redundancy level. The redundancy levels indicate the sensitivity of the SAN to a fault in one of the components. The method also includes receiving user policy settings allowing automatic correction of the SAN and auto-correcting the SAN in response to a change in the SAN state and in dependence on the user policy settings. The redundancy levels can be used by an administrator to set the user policy settings. An apparatus for carrying out the method is also provided.

19 Claims, 6 Drawing Sheets

DIAGNOSIS OF A STORAGE AREA NETWORK

RELATED APPLICATIONS

This patent application claims priority to Indian patent application serial no. 747/CHE/2007, titled "Diagnosis of a Storage Area Network", filed on 9 Apr. 2007 in India, commonly assigned herewith, and hereby incorporated by reference.

BACKGROUND OF THE INVENTION

Traditionally, large computing networks comprised a large number of servers with direct-attached storage. In such networks, disaster recovery can be slow and often only some of the storage capacity of each server is used because the servers can typically not share memory. If one server malfunctions, getting the system back up involves reinstalling the operating system, recovering the data from tapes and transferring the data to the server after the operating system has been reinstalled.

In storage area networks (SANs) the storage elements do not belong to individual servers. Instead, the storage elements are directly attached to the network and storage is allocated to the servers when required. The storage elements may be located remotely off the servers. Therefore, even if the infrastructure containing the servers is destroyed, the data can still be recovered. Moreover, the relocation of the hosts in the network is made easier because the storage elements need not be moved with the hosts. Additionally, the upgrade of the network is easier because the hosts do not have to be upgraded individually in their separate locations. Yet further, if one server malfunctions the downtime of the system is reduced because a new server can quickly be set up and pointed at the relevant storage volumes in the storage elements without the need of recovering the data.

A network of data links including a plurality of switches is required to connect the servers and the storage elements in a SAN. To further reduce the downtime of the network as a result of a failure of one or more of the components, redundant links are often included between the servers and the storage elements such that if one link malfunctions another one can be used and the network can be used without interruptions. To manage the system and ensure that there are enough redundant paths, a management program is often required. The downtime of the system can further be reduced if the management program can analyze faults, assess the state of the network and ensure that the input/output continuity is maintained with optimal performance.

The invention was made in this context.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
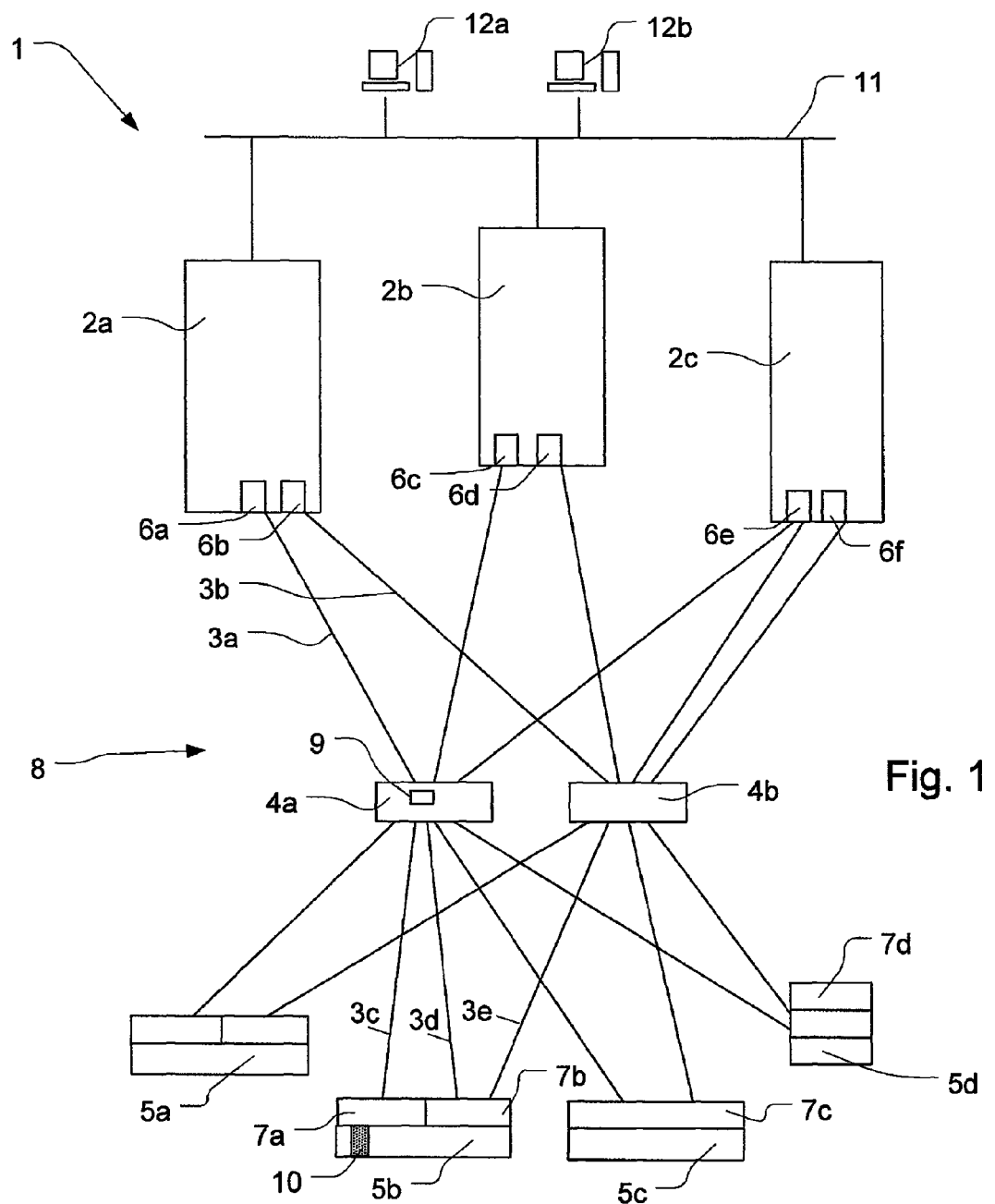
FIG. 1 is a schematic diagram of a SAN.

With reference to FIG. 1, a network 1 comprises a plurality of hosts 2a, 2b, 2c, connected to a plurality of data links 3a, 3b, 3c, 3d, 3e, a plurality of switches 4a, 4b and a plurality of storage elements 5a, 5b, 5c and 5d. The hosts may include but are not limited to servers 2a, 2b, 2c and client computers. The data links include but are not limited to Ethernet interfaces connections, Fibre Channels and SCSI (Small computer System Interface) interfaces. The storage elements comprise disk drives arrays 5a, 5b and 5c and tape drive arrays 5d.

Figure 2:
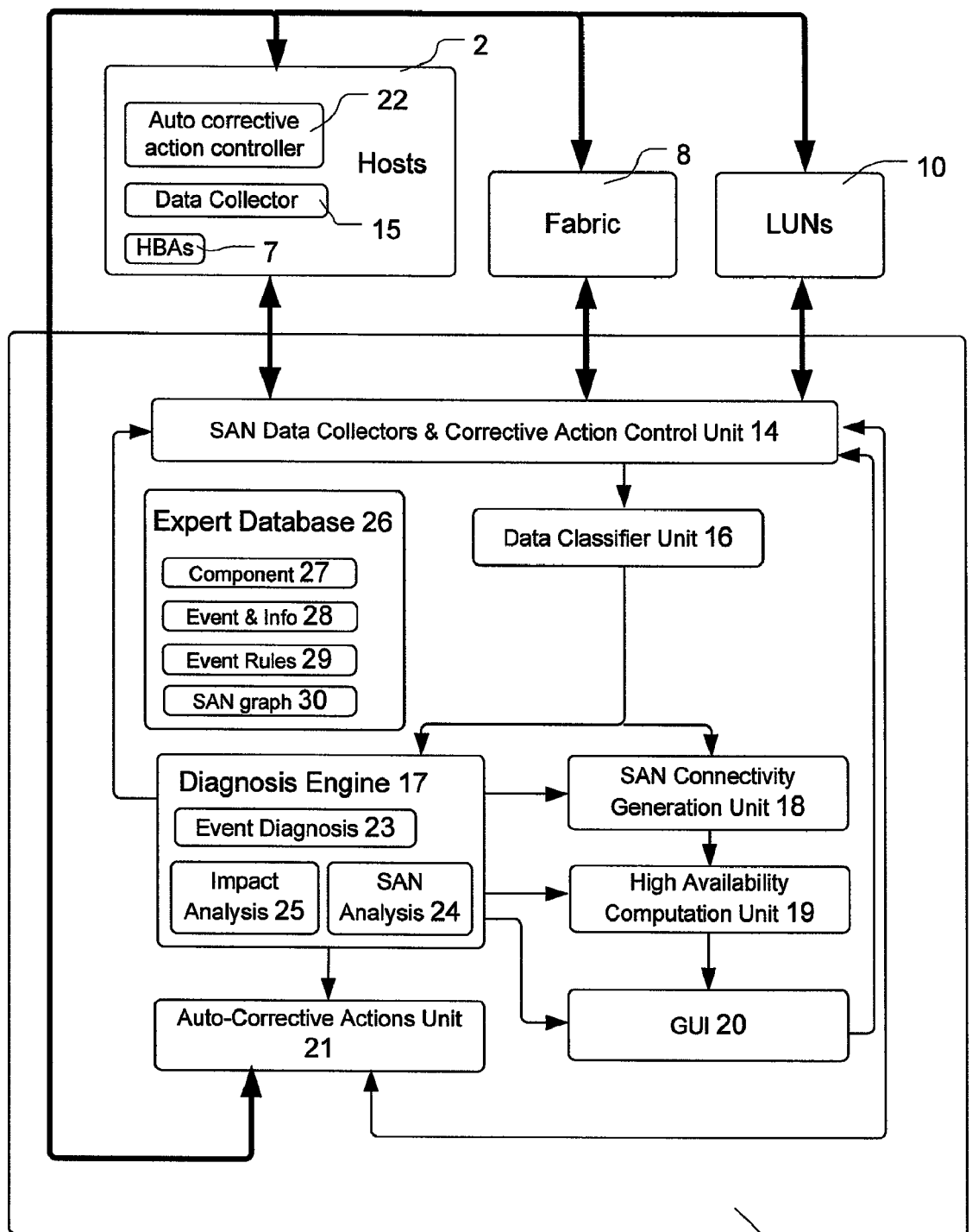
FIG. 2 is a schematic diagram of the internal circuitry and connections of a remote management station for the SAN.

Each host is connected to each storage element by at least two paths such that if a component or a data link in one path fails, data may still be exchanged between the host and the storage element using another path. Each server 2a, 2b, 2c therefore has at least one host bus adapter (HBA) 6a-6f for connecting to the data links 3a, 3b. Similarly, each storage element 5b or cluster of storage elements has at least one controller 7a-7d for connecting to the data links 3c, 3d, 3e. The role of the HBAs 6a-6f is to provide the interface between the host and the attached data link. It may further provide input/output processing to offload most of the host processing required for transferring data. The controllers 7a-7d perform a similar role for the storage elements. Like the switches, the HBAs and the controllers may also have more than one port to provide alternative paths. In FIG. 2, port 6e is shown to have two ports. The network of HBAs 6a-6f, data-links 3a-3e, switches 4a, 4b and controllers 7a-7d that connect the hosts and the storage elements make up what is known as the fabric 8.

Each component of the SAN has a number of subcomponents 9, any one of which may affect the performance of the system. For example, each switch may have one or more ports, fans and/or power supplies.

Each host 2a, 2b, 2c, is allocated a storage area which can be accessed through the fabric 8. The storage area may be distributed over different storage elements. The storage area is further typically divided into a number of Logical Unit Numbers (LUNs) 10, each of which corresponds to an actual of virtual portion of a storage element. For example, a LUN 10 may correspond to one or more disks in a disk drive array.

The servers may be connected in a LAN 11 to a number of client computers 12a 12b. The client computers may be directly connected to the SAN with their own data links, such as fibre channels, or indirectly connected via the LAN and the servers.

To monitor and control the SAN a remote management station is provided. With reference to FIG. 2, the remote management station 13 communicates with the hosts 2, the fabric 8 and the LUNs 10 through a TCP/IP network. The remote management station may also be connected to the LAN directly and may be one of the computers 12a and 12b. The remote management station 13 comprises a SAN data collector and corrective action control unit 14, which is the main unit for interfacing with the hosts, the fabric and the LUNs. As shown in FIG. 2, the hosts have HBAs 7 and data collectors 15 for communicating events in real time to the SAN data collector and corrective action control unit 14. Each component in the fabric and each LUN also have a data collector. However, for simplicity, the data collectors 15 of the fabric and the LUNs are not shown in FIG. 2. The data collectors in the hosts, the fabric and the LUNs may be Simple Network Management Protocol (SNMP) or Storage Management Initiative Specification (SMI-S) protocol based clients or custom interfaces and the communication of data from the data collectors of the components to the remote management station may be over, for example, TCP/IP socket based connections. The data collectors 15 are polled repeatedly for updated information by the SAN data collector and corrective action control unit 14. The data collected include event information, performance information and identification information.

The SAN data collector and corrective action control unit 14 is connected to a data classifier unit 16. The data classifier unit classifies the data into event and identification information and feeds the event and identification information data into a diagnosis engine 17 and a SAN connectivity generation unit 18 respectively. The diagnosis engine 17 is responsible for analyzing events and determining the impact of the events. The SAN connectivity generation unit 18 is responsible for assimilating the identity and connectivity information of the components in the SAN and creating a graph (SAN graph) representing all the components in the SAN and how they are connected. The SAN connectivity generation unit 18 is connected to the High Availability (HA) computation unit 19, which is responsible for analyzing the graph of the components in the network and generating sets of all paths between pairs of components (HA maps). The diagnosis engine 17 prompts the SAN connectivity generation unit 18 and the HA computation unit 19 to update the SAN graph and the HA maps responsive to the receipt of new event information that may have an effect on the state of the SAN.

Both the diagnosis engine 17 and the HA computation unit 19 are connected to the Graphical User Interface (GUI) 20 for communicating the state of the SAN to an administrator and recommending actions to be taken, if any. The GUI 20 can communicate with the SAN data collector and corrective action control unit 14 to allow a user to view and alter the polling frequency of the data collector. The polling frequency can also be altered automatically by the diagnosis engine 17.

The diagnosis engine 17 is operable to analyze any received event information to determine the impact and details of the associated event. In some instances, the impact may be critical enough for corrective actions to be taken. The diagnosis engine 17 reports to the auto-corrective actions unit 21 which may, if user settings permit, automatically correct errors in the SAN. This process will be described in more detail below. The auto-corrective actions unit may either directly communicate with an auto-corrective action controller 22 of a component of the SAN or it may report to the SAN data collectors and corrective action control unit 14 to allow it to interface with the hosts 2, the fabric 8 and the LUNs 10. If auto-corrective actions are not required or not allowed by the user settings, the diagnosis engine 17 may instead communicate recommendations for actions to the user via the GUI. Auto-corrective actions may also be communicated to the user when they are carried out.

The diagnosis engine 17 comprises an event diagnosis unit 23 for classifying events and using rules for determining an appropriate analysis of the impact of event, a SAN analysis unit 24 for controlling the update of the SAN graphs and the HA maps and an impact analysis unit 25 for determining the impact of an event based on the information generated by the SAN analysis unit.

The remote management station 13 is also connected to an expert system database 26. In FIG. 2, the expert system database is located in the remote management station. However, it may also be located remotely and accessed over the relevant LAN or the TCP/IP protocol. The expert system database 26 comprises a plurality of individual databases, including a component database 27, an event and information database 28, an event rules database 29 and a SAN graph database 30.

The component database 27 contains the manufacturer's information about all components compatible with the SAN. This database can be updated with details of new components as the new components are released on the market. The event and information database 28 stores all information collected from the data collectors. The event rules database 29 stores rules for deducting the cause of an event and the probable or actual consequences. This database can also be updated with new rules as new components are released. The updates can be performed without any interruptions to the operation of the remote management station. The SAN graph database 30 stores the SAN graphs and the HA maps computed by the SAN connectivity generation unit 17 and the HA computation unit 19. Data from the expert system database is retrieved and passed to the relevant unit in the remote management station when needed.

The processes performed by the units of the remote management station will now be described in more detail.

In order to determine the impact on the SAN of an event related to the state of one or more components, the connections in the SAN must be identified and analyzed. If a faulty component is part of a path between a host 2 and a LUN 10 and the path is the only available path between the two components, the fault will be a critical to the performance of the system. However, if the path is just one of a large number of paths the fault has only a minor effect of the SAN. Any alternative paths are referred to hereinafter as redundant paths.

Figure 3:
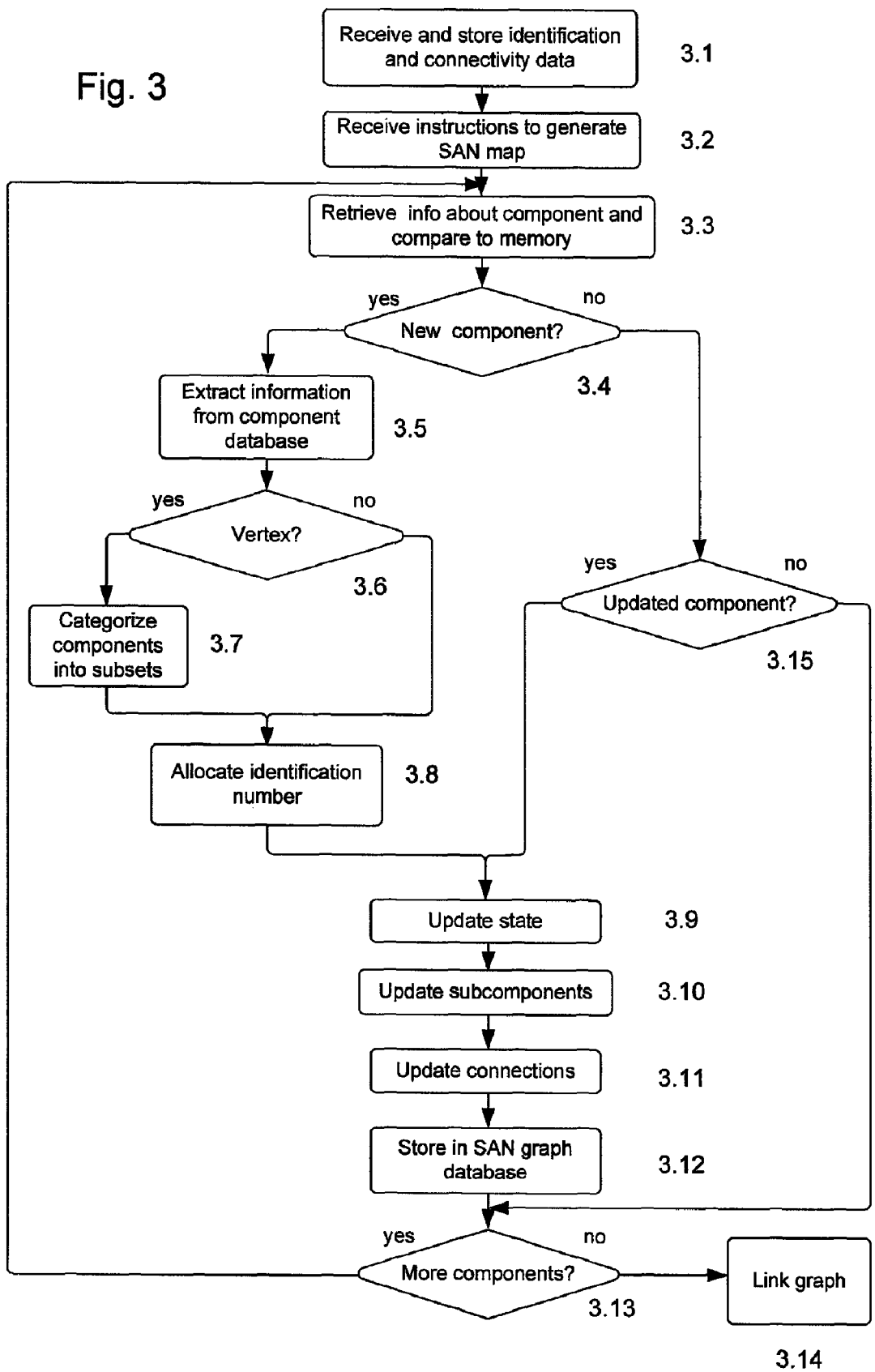
FIG. 3 illustrates a process of determining the connectivity of the network.

The generation of a SAN graph itself is known in the art. One example is briefly described with respect to FIG. 3. At step 3.1, the SAN connectivity generation unit 18 is receiving identification and connectivity data from the data classifier unit 16 and stores the data in the event and information database 28. At step 3.2, the SAN connectivity generation unit receives instructions to generate a SAN graph. This is received from the diagnosis engine 17 either at the initialization of the network or in response to event information, which is deemed by the diagnosis engine as likely to affect the state of the SAN. In some embodiments, instructions to the SAN connectivity generation unit 18 to regenerate the SAN graph may be communicated with a predetermined frequency, which is configurable by the user.

The SAN connectivity generation unit 18 retrieves, at step 3.3, from the event and information database 28, information about the first component of the SAN from which information has been collected since the last time a SAN graph was generated. The information received for the component may comprise vendor and model data, an identification number, for example a World Wide Name (WWN), and connectivity information allowing the SAN connectivity generation unit 18 to determine the neighbours of the component. Every component may not have an available collector. However, using information from available data collectors about the neighbours of components housing the data collectors, the details of all or at least a large proportion of the components can be pieced together.

At step 3.4, the SAN connectivity generation unit 18 checks whether information about the component already exists in the SAN graph database 30, i.e. whether the collected data concerns a known component or if a new component has been added to the network. If the component is a new component, the SAN connectivity generation unit, at step 3.5, enquires the component database 27 about additional information about the component. If the vendor and model data is provided, the SAN connectivity generation unit 18 is able to determine the type of the component using data from the component database 27.

The components of the network can be split into two sets, vertices and edges. The set of vertices (V) include the set of root-vertices (R), the set of hosts (H), the set of HBAs (A), the set of switches (S), the set of storage array controllers (C) and the set of Logical Unit Numbers (L). The set of root-vertices comprises one component that acts as the starting point to the entire SAN graph. The set of edges (E) is the set of data-links that connect the vertices, for example fibre channels. Two vertices can be connected by one or more edges.

If the component is determined to be a vertex at step 3.6, the process continues to step 3.7 and the type of the vertex is determined, i.e. R, H, A, S, C or L. The process then continues to step 3.8, an identification number is allocated and a record in the SAN graph database 30 is created. If at step 3.6, it is determined that the component is not a vertex, the component is an edge and the process continues directly to step 3.8, the edge is allocated an identification number and a record is established in the SAN graph database 30. In one embodiment, all vertices may be allocated an identification number $v_i$ and all edges may be allocated an identification number $e_i$.

The state of the component is updated at step 3.9, i.e. it is determined whether the component is active or non-active. If the event relates to a new component, the component will have logged in for the first time and the component is an active component. At step 3.10, the SAN connectivity generation unit determines and stores details about the subcomponents of the component. Depending on the type of the component, it may have one or more subcomponents, such as fans, power supplies etc. At step 3.11, details about the components to which the device is connected are determined. All the information is stored in the SAN graph database at step 3.12.

After all the relevant information about a component has been gathered and stored, it is checked at step 3.13 whether the data collected contain information about further components. If there is no information about additional components, the process ends at step 3.14. If the collected data contain information about further components, the process repeats from step 3.3. If at step 3.4 it is determined that there is already a record for the component in memory, it is checked at step 3.15 whether the information in memory needs updating. If not, the process continues directly to step 3.13 and it is determined whether the collected data contain information about further components. If at step 3.15, it is determined that the record in memory needs updating, steps 3.9 to 3.12 are repeated to update the record for the component. At step 3.9 it is determined whether the component is activate or inactive. For example, the collected data may indicate that the component has logged out, failed or been removed from the system in which case the state of the component will be recorded as inactive. At step 3.10, the states of the subcomponents are recorded. For example, the recorded data may indicate that one of the subcomponents has failed. At step 3.11, the connections are updated. For example, the recorded data may indicate that the connection has been lost to one of the neighbours originally recorded.

When information about all components have been added or updated, the graph is linked at step 3.14. Linking the graph involves checking all the connections, determining all paths between a source component and a destination component and organizing the data to be presented in a user-friendly way in the GUI to the administrator of the system.

Figure 4:
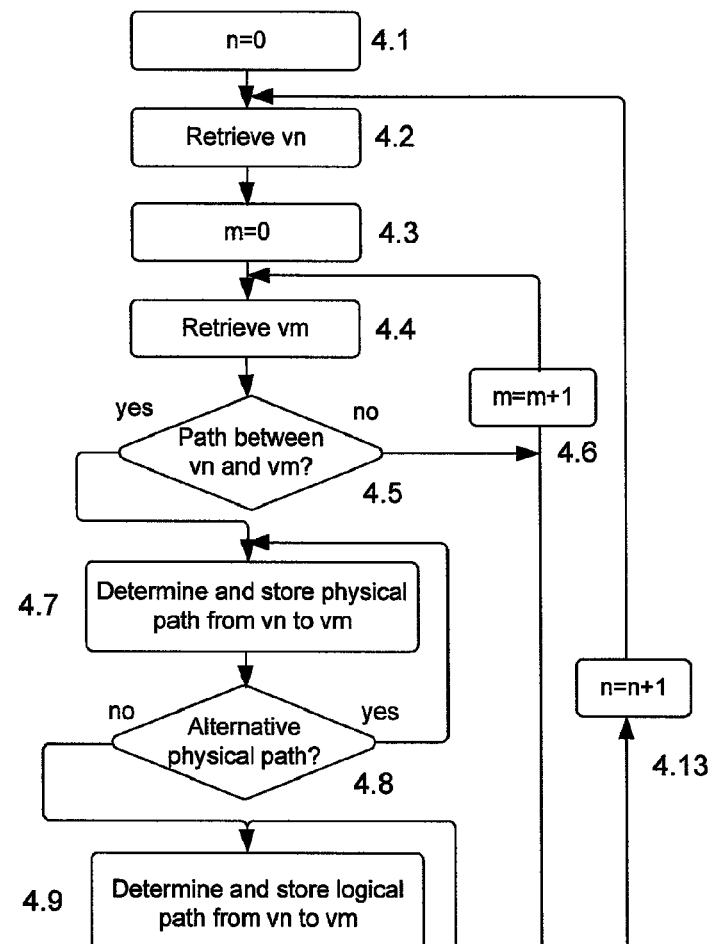
FIG. 4 illustrates a process of determining the logical and physical paths in the network.

The process of determining all paths between a source component and a destination component will now be described in more detail with respect to FIG. 4. When the SAN graph has been generated, a signal is forwarded to the HA computation unit 19. The HA computation unit then determines all paths between a source vertex and a destination vertex. At step 4.1, the dummy variable n is set to 0. Subsequently, the record for the vertex with identification number $v_n$, in this case $v_0$, is retrieved at step 4.2 from the SAN graph in SAN graph database 30. Dummy variable m also set to 0 at step 4.3 and the record for $v_m$ is retrieved at step 4.4.

At step 4.5 it is determined if there are any valid paths between $v_n$ and $v_m$. All edges are directional from a host to a LUN. Paths are only established in the direction from a host to a LUN. Therefore, for example, the paths between server 2a and 2c are not established, because that involves an edge going in the wrong direction. This step insures that only paths of interest are established and that paths between two vertices are only established once. For $v_n$ equal to $v_0$ and $v_m$ also equal to $v_0$, it is established at step 4.5 that there are no available valid paths, m is therefore increased by 1 at step 4.6 and it is then established at step 4.5 whether there are any valid paths between $v_0$ and $v_1$. When $v_0$ corresponds to server 2a and $v_1$ corresponds to LUN 10, it is determined at step 4.5 that there are valid paths and the process continues to step 4.7.

Both the physical paths and the logical paths are established for the pair of vertices $v_n$ and $v_m$. A physical path is the sequence of vertices between the pair of components. A logical path is the sequence of edges.

A physical path is established between vertex $v_0$ and vertex $v_1$ at step 4.7 and identification numbers of the vertices in that path are stored in an HA map in the SAN graph database. For server 2a and LUN 10, the path includes HBA 6a, switch 4a and controller 7a.

At step 4.8 it is checked whether there are alternative physical paths between host $v_0$ and LUN $v_1$. If it is established that there are alternative paths, step 4.7 is repeated and it is determined that an alternative path of HBA 6a, switch 4a and controller 7b exists. Steps 4.7 and 4.8 are repeated until all valid paths are found. The third and last path of HBA 6b, switch 4b and controller 7b is therefore also found. All paths are stored in the physical HA map, $HA_p(v_0, v_1)$, in the SAN graph database 30 with their respective sequences of vertices.

When there are no more alternative physical paths, the process continues to step 4.9 and a logical path between the two vertices is established. In the example discussed above, one logical path between host 2a and LUN 10 includes edges 3a and 3c. At step 4.10 it is determined whether there are alternative logical paths and, if there are, step 4.9 is repeated. In the example above, two additional paths, consisting of edges 3a and 3c and edges 3b and 3e respectively are found. All paths are then stored in a logical HA Map $HA_L(v_0, v_1)$ in the SAN graph database 30 with their respective sequences of edges.

When all the logical paths have been stored it is determined at step 4.10 that there are no more paths between $v_0$ and $v_1$, the process continues to step 4.11 and it is checked whether there is a vertex with a higher identification number than m. If there are, m is increased by 1 at step 4.6 and steps 4.4 to 4.10 are repeated for all paths between $v_0$ and $v_2$. When the valid paths between vertex $v_0$ and all other vertices have been established, it is determined at step 4.11 that there are no more vertices and the process proceeds to step 4.12. It is now determined whether there are any vertices in the system from which all paths have not been established. If there are, n is increased by 1 and steps 4.2 to 4.12 are repeated. The steps are repeated until the valid paths between all pairs of vertices in the system have been established and stored as physical and logical HA Maps.

The SAN graphs and the HA maps are communicated to the administrator both graphical and numerically using the GUI. The components may be represented as graphical icons schematically linked to each other in a graphical view. The components may further be categorized according to their types and when a component is selected, the GUI may show the direct and indirect neighbours of the selected component graphically. All the paths between a selected source vertex and a selected destination vertex may also be shown.

From the SAN graphs and the HA maps, an indication of the redundancy and therefore the sensitivity of the SAN to faults can be determined. An indication of the state of the SAN can also be determined. According to the invention, the redundancy levels of the network are modeled as fuzzy sets, where different SAN topologies have varying degrees of membership in these sets, based on the redundancies they provide. The membership function of the fuzzy set determines the degree to which a given SAN topology is a member of this set. The SAN Analysis Unit 24 determines the logical path connectivity set, the physical component connectivity set and the component internal redundancy set as will be described in more detail below with respect to FIGS. 5, 6 and 7. If there are a large number of paths between a host and an end LUN, the path redundancy is very high and the connectivity has a high degree of membership in the logical path connectivity set whereas a switch that only has one subcomponent of each type, and therefore has a low component redundancy, has a low degree of membership in the component internal redundancy set.

Figure 5:
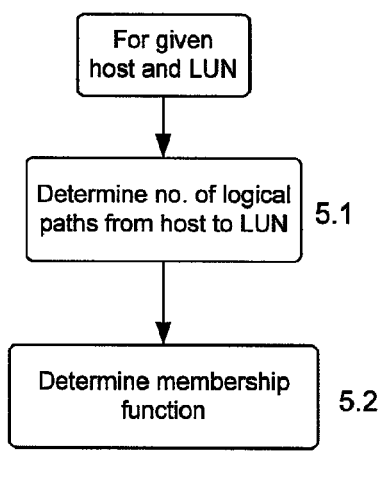
FIG. 5 illustrates a process of determining a logical path connectivity set.

The logical path connectivity set indicates the redundancy level in logical path connectivity. The higher the redundancy the less sensitive the system is to a fault in one of the components of the system. The level of redundancy is indicated as a value between 0 and 1, where 0 is no redundancy at all and values tending to 1 indicate a high redundancy. With reference to FIG. 5, for a given host and a given LUN, the number of logical paths from the host to the end LUN is determined at step 5.1. For example, in FIG. 1, there are three logical paths from server 2a to LUN 10. The number of logical paths is stored in the SAN graph database 30.

When the number of logical paths has been determined the membership function value is calculated at step 5.2. For example, the membership function may be modeled as a sigmoid function. A low value indicates that the degree of membership in the set of highly redundant paths is low and a high value indicates that the degree of membership in the set of highly redundant paths is high.

The logical path connectivity set is represented by the notation {Nlp, f(Nlp)} where Nlp is the number of logical paths from a given host to a given LUN and f(Nlp) is the membership function. The values for any combination of hosts and LUNs are computed in a similar way and included in the set.

The physical component connectivity set indicates the redundancy of components between two vertices. The higher the number of components of each type, the less sensitive the system is to a fault in one of the components of that type in the path.

The physical component connectivity set can be used to determine vertices that constitute the only vertices of a particular kind between a host and an end LUN. In other words, the physical component connectivity set can be used to establish potential single point of failures between a host and an end LUN.

Figure 6:
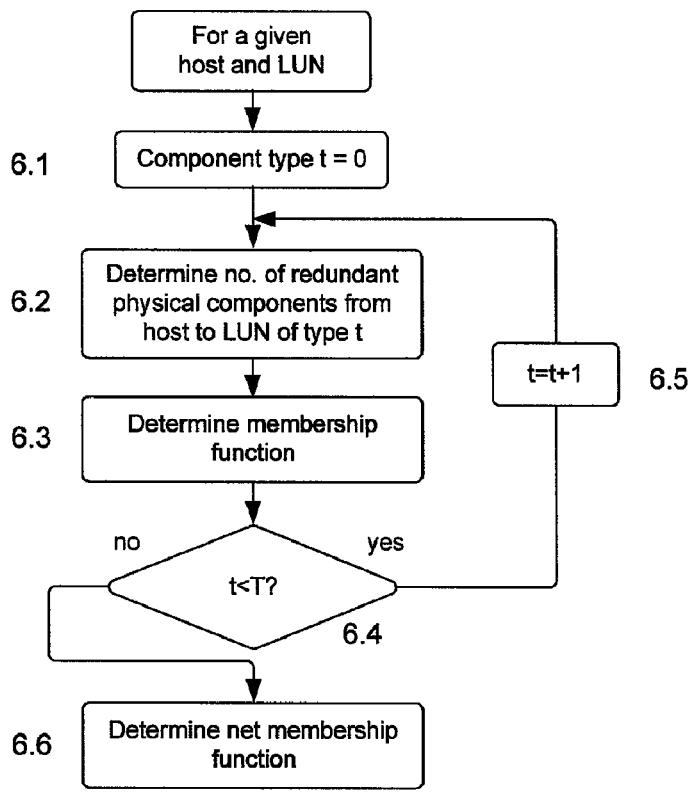
FIG. 6 illustrates a process of determining a physical component connectivity set.

With reference to FIG. 6, for a given host and a given LUN, a component type t, for example a HBA, switch or a controller, is determined at step 6.1 and the number of redundant physical components of type t in the paths between the host and the LUN are determined at step 6.2. In FIG. 1, there are three paths between host 2b and LUN 10. The paths include two components of a first type, for example HBAs. The number of redundant components of this type is stored in the SAN graph. At step 6.3, the membership function value is determined for the HBAs. For example, the membership function may be modeled as a sigmoid function. The membership function can take a value between 0 and 1 divided by the number of types of components. A high membership value indicates that there are many redundant components and the failure of the system may only have a minor effect on the state of the overall SAN. A very low membership function indicates that there is no redundancy for a particular component type and the single component is included in all paths and therefore acts as a single point of failure between the host and the LUN.

At step 6.4, it is determined whether there are additional component types that have not been considered. If there are, t is increased by 1 at step 6.5 and steps 6.2 to 6.4 are repeated until all component types have been considered. It is therefore established that there are also two switches 4a, 4b and two controllers 7a, 7b in the paths between host 2b and LUN 10. When it is determined at step 6.4 that all component types have been considered, the process continues to step 6.6 and the net membership function value is established, which it the sum of all the membership function values for all the component types.

The physical component connectivity set is represented by the notation {Npc, f(Npc)} where Npc is the number of physical components from a given host to a given LUN of each type and f(Npc) is the membership function.

The overall SAN logical and physical connectivity state is influenced by membership function values of the paths that have the lowest logical and physical membership values respectively. If the membership function for a path that previously had a non-zero value now is equal to zero, the overall state of the SAN is 0 and shown to the user as FAILED. The different states of the SAN will be discussed in more detail below.

Figure 7:
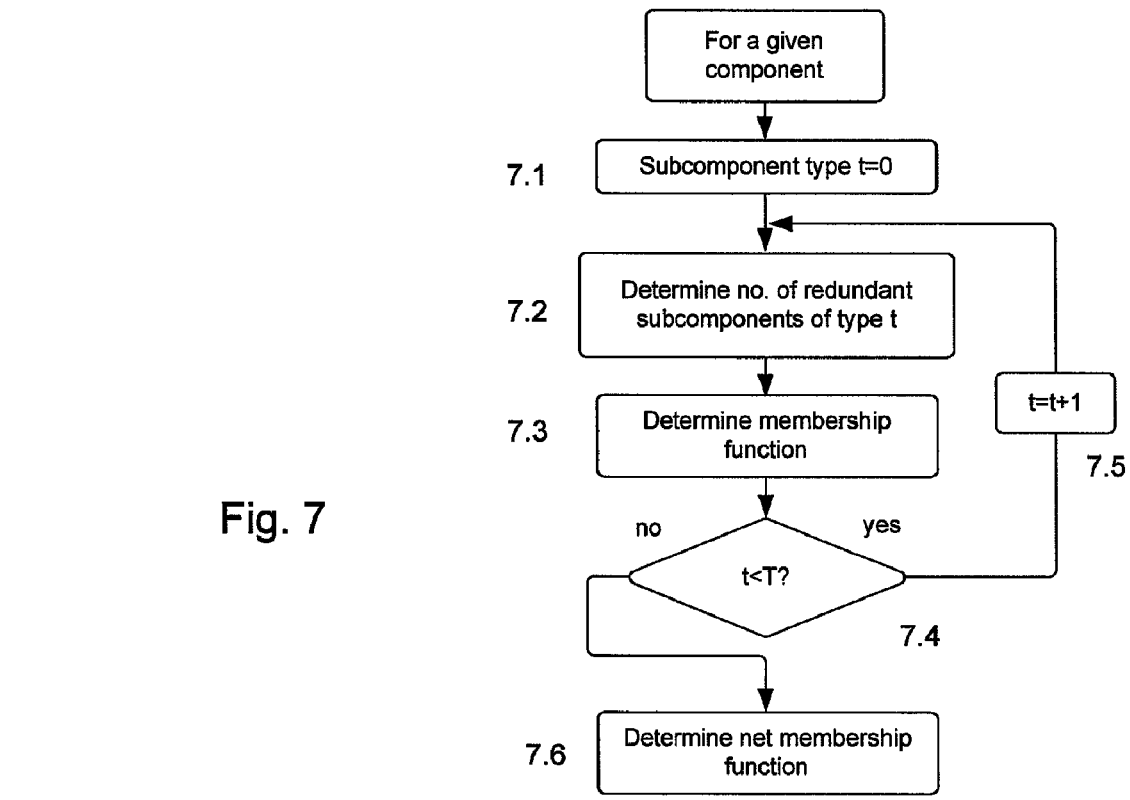
FIG. 7 illustrates a process of determining a component internal redundancy set.

The component internal redundancy set is used to determine the sensitivity of a component to the failure of a subcomponent. With reference to FIG. 7, for a given component, a subcomponent type t, for example a fan or a power supply, is determined at step 7.1 and the number of redundant physical sub-components of type t in the component is determined at step 6.2. The membership function for the type of subcomponent for the particular component is then determined at step 6.3. For example, the membership function may be modeled as a sigmoid function. The membership function can take a value between 0 and 1 divided by the number of types of subcomponents for that component. A high membership value indicates that there are many redundant subcomponents and the failure of one of the subcomponents may only have a minor effect on the state of the component. A very low membership function indicates that there are no redundant subcomponents of a particular sub component type and if the subcomponent fails the component is likely to fail.

After the membership function value has been calculated, it is determined at step 7.4 whether there are any subcomponent types that have not been considered. If there are, t is increased by 1 at step 7.5 and steps 7.2 to 7.4 are repeated until all subcomponent type for the particular component have been considered.

Using switch 4a as an example, through the process of FIG. 7, it is determined that there is one fan, 4 HBA ports and 4 controller ports.

At step 7.5, the net redundancy component value is determined by adding the membership function values for all the subcomponents of the component.

The component internal redundancy connectivity set is represented by the notation {Nsc, f(Nsc)} where Nsc is the number of redundant subcomponents of a specific type and f(Nsc) is the membership function.

The net component internal redundancy level of the SAN is determined as the membership function value of the component that has the lowest internal redundancy.

The logical path connectivity set, the physical component connectivity set and the component internal redundancy set are all stored in memory in the SAN graph database. The connectivity and the component redundancies are presented both graphically and quantitatively to the user using the graphical user interface.

After the SAN graph, the HA map, the logical path connectivity set, the physical component connectivity set and the component internal redundancy set have been computed the first time, changes in the values of the sets can be compared to the initial values and the performance of the SAN can be deduced. Moreover, according to the invention, the diagnosis engine 17 can determine the impact of an error or a fault reported by the data collectors by recalculating the maps and the sets.

Every time the SAN is updated and is fully functioning the administrator can store the computed SAN graph as a reference graph. When the SAN graph is subsequently updated, the GUI will show the state of the SAN as "Robust" if all paths in the reference SAN graph are available. The state of the SAN can instead of "Robust" be indicated as "Failed", "Critical", "Degraded" and "Available". A "Failed" SAN or path can, for example, indicate that the connectivity to an end LUN 10 has been lost. A "Critical" state may indicate that there is only one path to an end LUN with one component of each type in the path. Consequently, both the logical connectivity and the physical connectivity of the path is zero or near zero. A "Degraded" state may correspond to a state with an overall membership function value between 0 and 0.5. For example, there may be multiple paths to an end LUN but all the paths go through a single component and the component therefore represents a single point of failure. In this case, the logical path connectivity can be high, i.e. it can be nearer 1 but the physical component connectivity for one of the component types is 0. The state of the component that constitutes the single point of failure may also be shown as "Degraded". An "Available" SAN may correspond to a state in which there are multiple paths to an end LUN but in which the overall state, derived from the fuzzy sets is between 0.5 and 1 The threshold values of the membership function for the SAN to be indicated as an available or degraded SAN may be adjusted by the administrator.

Table 1 shows examples of different states.

TABLE 1

| State | Definition | Comments |
| --- | --- | --- |
| Failed | Loss of connectivity to an end LUN | |
| Critical | Only one path to an end LUN with one component of each type in the path | This is if there were multiple paths earlier |

TABLE 1-continued

| State | Definition | Comments |
| --- | --- | --- |
| Degraded | Multiple paths to an end LUN but one component constitutes a Single Point Of Failure, (Net state of SAN is lower than 0.5) | This is also on a per component basis |
| Available | Multiple paths to an end LUN (Net state is higher than 0.5 and lower than 1) | This is also on a per component basis |
| Robust | All paths available | Based on initial scan determination |

The state of the SAN and affected components is calculated each time a new event is reported which is judged by the event diagnosis unit 23 as likely to affect a SAN state. Not all events result in a change in the system. The remote management station classifies the events and then uses rules to evaluate the likely impact of the event before determining how the impact on the system should be evaluated, if at all. The processes for doing this are described in more detail below with respect to FIG. 8.

When an event is received from the SAN data collector and corrective action control unit 14, the data classifier classifies the event as an informational, warning or critical event. The data is stored in the event and information database 28 as one of these three classes. Critical events typically involve the failure of a component or subcomponent. A warning event is associated with activity that may result in the failure of a component or a connection. An information event is not usually associated with a failure. If the warning event is likely to result in a failure, the event information can be treated as a critical event during the event analysis process carried out by the diagnosis engine 17. Similarly, an informational event may be treated as a warning event or a critical event. Rules saved in the event rules database are used by the event diagnosis unit 23 to determine how an event should be treated. For example, an information event can correspond to the disabling of an HBA by a user. This does not mean that the HBA has failed. However, the rules may provide that if there are no other HBAs from a host to a particular LUN, the event should translate into a warning event. How an event is analyzed is described below in more detail with respect to FIG. 8.

Table 2 shows how an event is initially classified as an informational, warning or critical event.

TABLE 2

| Event Type | Typical Events under this type | Comments |
| --- | --- | --- |
| Informational Events | Administrative events, SAN component log in/log outs, Identification and Connectivity information | Log in/log outs can also be a warning event |
| Warning Events | Signal loss, Sync loss, CRC errors, Component temperature fluctuations, Sub component failures (fans) | These errors can potentially be critical |
| Critical Events | Component core functionality failures: HBA failure, Switch failure, Switch sub component failure, Array/controller failures, Link failures | |

The event diagnosis unit 23 further classifies failures or potential failures as hard, soft or probabilistic. Depending on the category, the failure is dealt with differently. A hard event includes a failure of a host bus adapter, a switch, a controller, a storage element or a data link. The failure of such a link is always classified as a critical event. A hard event also includes the failure of a sub-component of a HBA, a switch, a controller or a LUN, including, but not limited to, ports, SFP (Small Form-Factor Pluggable) transceiver, fans and power supplies. The failure of a sub-component may result in a partial failure of a component. Such failures can be either critical or warning events depending on the impact of the failure. For example, if the component comprises redundant subcomponents of the same type, i.e. the internal component redundancy membership function value for that component is high, the failure of a subcomponent may not be critical to the state of the component and then the failure can be classified as a warning. Soft failures involve HBAs, switches, arrays controllers, storage elements and data-links resetting and rebooting themselves or having to be reset or rebooted manually. Soft failures can affect the whole component or a subcomponent. Soft failures are classified as critical or as warning events. Probabilistic failures include synchronization losses, signal losses and link errors in optical interfaces, GBIC (Gigabit Interface Converter), SFP and HBA lasers and in faulty optical cables and may be due to faulty or aging components. Table 3 shows to which category different events belong.

TABLE 3

| Failure type and associated event type | Error event | Examples | Comments |
|---|---|---|---|
| Hard - Critical | Component hard failures | HBA, Switch, Array, Controller, LUN, and Links | Sudden death situations of components, Link failures |
| Soft - Critical/ Warning | Component soft failures | Reset/reboot conditions of the above | Errant component. Non deterministic situation |
| Hard - sub component - Critical/ Warning | Sub-Component failures (partial component failure) | Sub-components of HBA, Switch, Array, Controller and LUNs: Ports GBICS Fans/Power supplies | Partial failure of components. Deterministic situation |
| Probabilistic - Critical/ Warning | Sync Loss, Signal loss, link error | Optical interfaces (transceivers), GBIC, SFP, HBA lasers and faulty optical cables | Faulty or ageing component. Non deterministic situation |

The event diagnosis unit 23 further checks whether the events are external events or internal events. An external event is an event that indicates a change of a state of a component connected to the component that reported the event. For example, if a communication link to a neighbouring component is lost, the loss of the link is communicated and the information is classified as an external event. For external events, additional information about the event from neighbouring components may be needed to diagnose the event properly.

Figure 8:
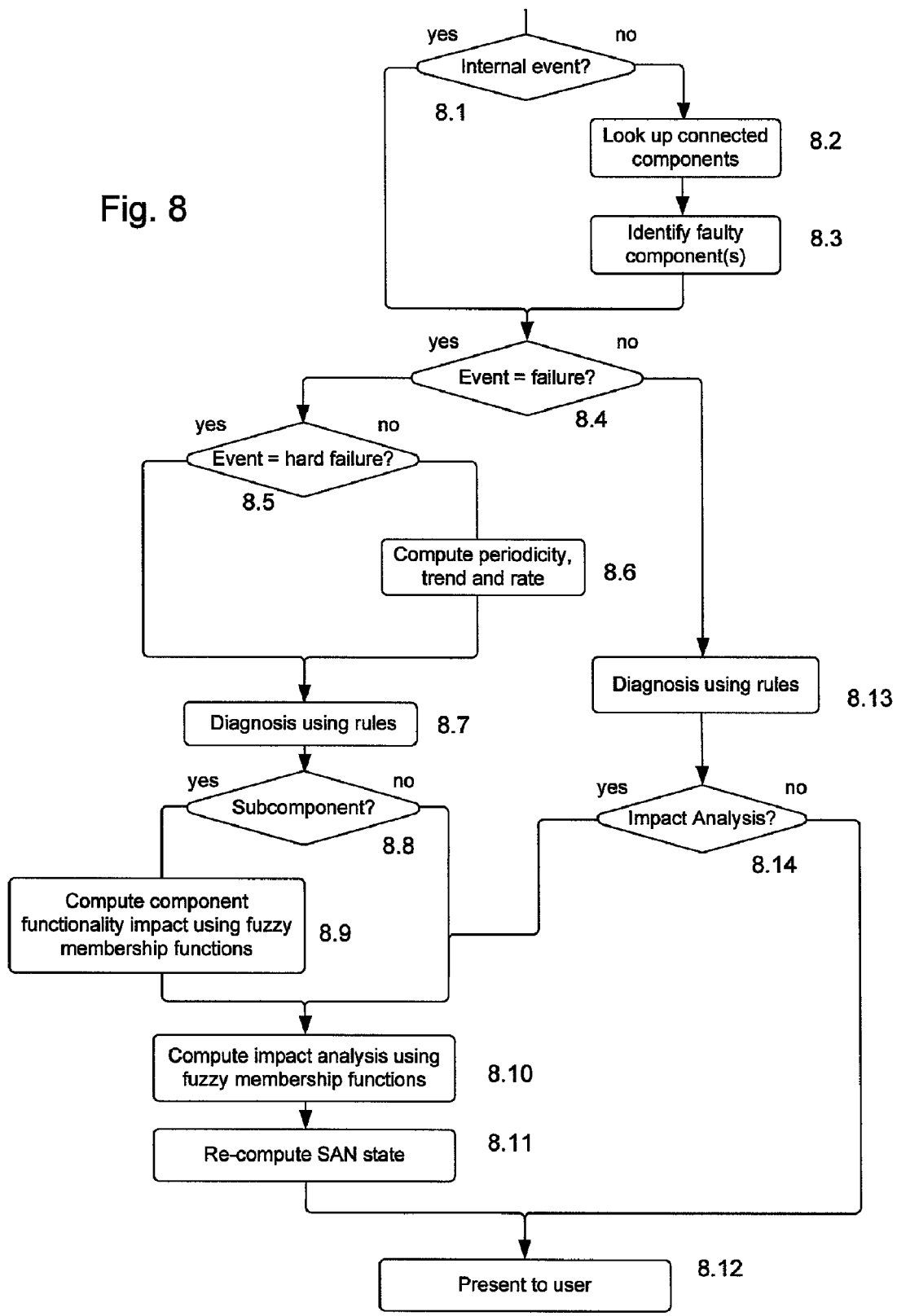
FIG. 8 illustrates a process of analyzing the type of an event in the SAN and determining the impact of the event.

With reference to FIG. 8, it is determined at step 8.1 whether the event is an external event. For example, the event may involve a report from an HBA that there is loss of signal. The event report may include the parameter "LossOfSignal-Count" and the rules indicate that this corresponds to an associated event of a loss of a signal or loss of synchronization of a signal. The event is not internal to the component because it relates to the communication between the HBA and the rest of the fabric. Therefore, the event is classified at step 8.1 as an external event.

If the event is an external event, the direct and indirect neighbours are determined from the SAN graph at step 8.2. Moreover, error reports and connectivity data of these neighbours are checked to determine which component triggered the event at step 8.3. If the HBA that reported the event was HBA 6a, shown in FIG. 1, data collected from switch 4a may be retrieved. If not all components have data collectors or there is limited event information, the event may not be pinpointed to a single component. In that case, the region of components in which the event arose is determined. Collected data from the switch 4a connected to the HBA may indicate that the switch is working fine and that there is only a problem with the communication between the HBA and the data link 3. When the component or region of components has been determined, the process continues to step 8.4. If it was determined at step 8.1 that the event was an internal event, the process continues directly to step 8.4.

It is checked at step 8.4 whether the event was a failure, i.e. a critical event. If the event is a failure it is determined at step 8.5 whether the failure was a hard failure, i.e. a deterministic failure of a component or subcomponent. If the failure is not a hard failure, but a soft or probabilistic failure, the process continues to 8.6 and the severity of the soft or probabilistic failure is computed.

Using the above example of the loss of signal reported by the HBA, the event would have been classified by the data classifier unit 16 as a warning event. However, rules consulted at step 8.4 may indicate that the event may be critical because the loss of signal can result in the link failing and that, therefore, the event should be treated as a failure for the event analysis. The process therefore continues to step 8.5 and it is determined that the event is a probabilistic failure.

At step 8.6, the periodicity of the error is determined. In the loss of signal example, the number of times a loss of signal has been recorded and the average time between the loss of signal and reconnection is determined. If, instead, the error relates to an HBA that constantly needs rebooting, the frequency of reboots is determined.

Moreover, a trend is computed from the periodicity data. Additionally, a rate associate with a change in the trend is computed. For example, it may be determined that the trend of reboots with time is a non-linear relationship. The rate of change of the reboots in the non-linear relationship is then also determined.

Predetermined rules are used to determine the severity of the probabilistic or soft failure at step 8.7. The rules may take as input the values of the connectivity and internal redundancy sets, the periodicity, trend and rate data, the manufacturer's threshold values and the required performance levels of the SAN. The rules are also used to determine the cause of the error. The rules may be stored in XML files in the rules database 29.

Using the example of the loss of signal event reported by the HBA again, a rule may provide that if the frequency of the loss of signal reports is greater than a predetermined threshold value, if the time period between loss of signal and reconnection is also greater than a predetermined threshold value and the associated event value is greater than an associated event threshold value then there is a "Potential Link Failure". An associated event value is a value associated with a related event. A loss of synchronization event is associated with a loss of signal event and finally a loss of link event.

If the error is a hard failure, the periodicity trend and rate is not necessary because the component is already permanently failed and the process continues directly to step 8.7 and rules are used to determine the cause and severity of the failure.

For example, if the event information includes a HBA_PORTSTATE LINKDOWN error, it is determined at step 8.1 that it is an external event, i.e. a link in the fabric from a port of an HBA is not working. Data collected from connected components such as the switch connected to the link may be checked at step 8.2 and it is confirmed at step 8.3 that it is the link that caused the error. At step 8.4, the rules in the event rules database 29 are consulted and it is determined that a HBA_PORTSTATE_LINKDOWN error is associated with a failure. Therefore, the process continues to step 8.5 and the event is analyzed. Since one of the ports is down, the error is classified as a hard failure at step 8.5. At step 8.7, it is determined, using rules that the error corresponds to an HBA Port Interface failure.

Irrespective of whether the event is a hard event, a soft event or a probabilistic event it is then determined at step 8.8 whether the error relates to the whole component or a sub-component. If the error relates to only a sub-component the component internal redundancy level for the subcomponent is computed at step 8.9 as shown in FIG. 7 in order to determine whether the event may cause a change of state of the component and thereby possibly the whole SAN. The process then continues to step 8.10. If it is determined that the error relates to the whole component, the process continues to step 8.10 directly.

At step 8.10 the impact analysis as a result of the error is performed. Using the example of the loss of signal reported by the HBA, the logical path connectivity set and the physical component connectivity sets, as set out in FIGS. 5 and 6 are determined from the host to which the HBA is connected to the or each end LUN that the HBA leads. If it is determined that there are no other HBAs in the paths between the host and the or each LUN, i.e. the membership function for the HBA in the physical component connectivity set is zero, it is determined that there is a component level single point of failure. If, instead or additionally, it is determined that there is only one path from the HBA to the or each end LUN, it is determined that there is a path level single point of failure. The single point of failure information can then be presented together with the determination at step 8.7 of a "Potential Link Failure" warning to the administrator.

Using the example of the link failure reported by an HBA, at step 8.10, the logical path connectivity set and the physical component connectivity set, as described in FIGS. 5 and 6, are determined from the host to which the HBA is connected to the or each end LUN to which the HBA leads. If it is determined that there are no other HBAs in the paths between the host and the LUN and that there is only one path, it is determined that there is a "Critical Loss of Connectivity". If, instead, it is determined that there are no other HBAs in the paths, but that there is more than one path, for example the HBA has an alternative port that is still communicating with its respective link, then there is no "Loss of Connectivity" but the alternative path, through the alternative port, may constitute a path level single point of failure. This information can be stored to be presented to the user later.

The process then continues to step 8.11 and the net state of the SAN is re-computed. A comparison of the state of the SAN to the previous state of the SAN is carried out to add value to the recommendations and advice to the user. The output of the membership function computed at step 8.10 can be used in conjunction with user specified policy settings for recommending actions to an administrator. The information is then presented to the user at step 8.12 along with recommendations for corrective actions.

In the example of the failed link to an HBA, the SAN state will be presented to the user as failed. In the example of the loss of signal reported by the HBA, the SAN state will be presented as degraded, if, for example, the HBA is found to constitute a component level single point of failure. The administrator may also be informed that the event that caused the degraded state is a "Potential Link Failure" warning.

If at step 8.4 it was determined that an event was not a failure, for example the event information related merely to the state of a switch being offline, the process continues to step 8.13 and a diagnosis using rules is performed. The rules may indicate that the consequences of an offline switch can have critical consequences and that, therefore, impact analysis should be performed, even though the event did not relate to a failure. For example, if the physical component connectivity set comprises a low value for switches in one of the paths in which the controller was included, the event may still have a serious impact on the performance of the system. At step 8.14 it is determined whether the rules indicate that an impact analysis should be performed. If an impact analysis is required the process continues to step 8.10. Otherwise the process continues directly to step 8.12 and the information is presented to the user.

If it is determined that an impact analysis is required, the logical path connectivity values as set out in FIG. 5 and the physical component connectivity as set out in FIG. 6 are determined for the switch and the paths from the, or each, hosts to the, or each, LUNs between which the switch is connected. If it is determined at step 8.10 that there are no other switches in the paths between a particular host and a particular end LUN, then there is a loss of connectivity. The overall state is then determined at step 8.11 to be failed and the state of the SAN and the switch is reported to the administrator at step 8.12.

Each time an event has been analyzed, the GUI may update the information communicated to the user. Any failures in the system may be categorized in the GUI under component type or state type. For example, there may be a list of components under each of the headings "failed", "critical", "degraded" and "available". Selecting one of the components may show the user the result of the error analysis, for example the cause of the error. Also, the user may be shown both graphically and numerically the results of the impact analysis. For example, if a host is selected, the GUI may show the number of paths to each LUN, the state of those paths and whether there is a single point of failure in the path.

The administrator may set the settings of the system such that if the state of a component or a state of the SAN is critical, auto-corrective actions are carried out. The output of the membership functions determined during the impact analysis can be used in conjunction with user specified policy settings for taking the necessary auto-corrective actions. The user settings are typically policies for initiating corrective actions based on the state of the SAN, i.e. level of path or component redundancy in the SAN determined by the fuzzy logic.

The event rules database 29 includes rules for determining an appropriate corrective action. Auto-corrective actions include, but are not limited to, the suspension of errant components and the enablement of re-routing of communication between particular pairs of components using multi-path control to ensure input/output continuity and appropriate load balance. If the user policy settings do not allow auto-corrective actions, the GUI may still recommend the actions determined based on the rules in the event rules database 29.

An example of a situation in which an auto-corrective action can be carried out is when there is a single point of failure between a host and an end LUN. This will happen if all other paths have failed. The single point of failure may be identified as a result of an input/output time-out event reported by a host. For example, if the input/output load is high, a single point of failure may result in that there are input/output delays or timeouts. The event may be treated as a warning event associated with a failure and the periodicity, trend and rate may be determined at step 8.6 and compared against known values at step 8.7. The impact analysis carried out as step 8.10 may then show that the path constitutes a single point of failure and the net state of the SAN may then be shown as critical in the GUI at step 8.12. The administrator may have set the user policy settings to provide that if the input/output load between the host and the LUN connected by the path is high, there is a single point of failure or the membership function value of the connectivity set is lower than a predetermined value, auto-corrective actions should be carried out. The auto-corrective actions may include providing input/output instructions more often if they time out or instructing the host SCSI driver to back off and retry again.

Another situation in which auto-corrective actions may be appropriate include if the event information related to a soft failure of a port in a switch that switches between an active and a faulty state. In that case, the periodicity, trend and the rate may be determined at step 8.6. If the trend is a non-linear increase, the rate of the non-linear increase is compared with a known field value in accordance with rules in the event rules database 29. If the rate is higher than the known value, the port is considered faulty. The physical component and logical path connectivity is also computed at step 8.10. If the user policy settings allow, the rules for auto-corrective action are then consulted. These may provide that if alternative paths were found at step 8.10, the communication between a particular host and an end LUN affected by the switch should be re-routed through an alternative path and the port of the switch should be suspended. The re-routing can be enabled by the auto-corrective action controller 22 in the affected host and the auto-corrective actions unit 21 can instruct the controller 22 directly to enable the re-routing. The suspension can be carried out in the switch itself by the switch disabling the port. An instruction to the switch to disable the port can be forwarded through the SMI-S Interface with the help of the SAN data collector and corrective action control unit 14.

According to some embodiments, there is therefore provided analysis of events, the use of the analysis of events to calculate the redundancy level of a storage area network, a determination of the state of the storage area network based on the redundancy levels to assess impact on performance and high availability availability, and recommendations and corrective actions to mitigate downtime.

It is assumed that while various rules and components have been described and illustrated with respect to the drawings, these are merely specific examples of the invention, and modifications and variations are possible. For example, the various steps of FIG. 8 may be performed in a different order. Additionally, some steps may be left out and other steps may be added. More specifically, impact analysis, as described with respect to step 8.10 of FIG. 8, may not be carried out for all failures. For example, if the rules indicate that a probabilistic failure is not likely to result in a failure, the path and component connectivity computations may not be necessary.

It should further be understood that the specific categorization described of the event data can be varied and other categories can be used.

The invention claimed is:

1. A method of determining a state of a Storage Area Network SAN, comprising
analysing data collected by a remote management station from components in the SAN;
calculating a redundancy level of the SAN based on the analysed data; and
determining the state of the SAN based on the calculated redundancy level, wherein the state of the SAN comprises a state value that indicates an overall SAN connectivity state based, at least in part, on a lowest redundancy path of the SAN;
wherein the calculated redundancy level comprises a value in a range, a low value indicating a low path or component redundancy and a high value indicating a high path or component redundancy.

2. A method according to claim 1, wherein a redundancy level is modelled as a fuzzy set in which different SAN topologies have varying degrees of membership, approximated to a sigmoidal function, in the fuzzy set, based on the redundancies they provide.

3. A method according to claim 1, wherein determining the state of the SAN comprises determining the impact of a failure of a component.

4. A method according to claim 1, further comprising at least one out of recommending actions to an administrator and taking auto-corrective actions based on policy defined by the administrator.

5. A method according to claim 1 wherein calculating a redundancy level comprises calculating the number of logical paths between two components and determining a membership function value based on the number of logical paths.

6. A method according to claim 5 wherein the output based on the membership function can be used by the user to set policies for auto-corrective actions.

7. A method according to claim 1 wherein calculating a redundancy level comprises calculating the number of redundant components of each type in the paths between two components and determining a membership function value based on the number of redundant components.

8. A method according to claim 1 wherein calculating the redundancy level comprises calculating the number of redundant subcomponents of each type in a component and determining a membership function value based on the number of redundant subcomponents.

9. A method according to claim 1 wherein analysing data comprises receiving event information from a plurality of components in the system, the method further comprises classifying the event as external or internal and if the event is an external event consulting neighbouring components of the component reporting the event to localise the origin or region of origin of the event.

10. A method according to claim 1 wherein analysing data comprises receiving event information from at least one component and the method further comprises classifying the event information as relating to a hard, a soft or a probabilistic event.

11. A method according to claim 10 further comprising performing failure rate and trend of failure analysis for soft and probabilistic events.

12. A method according to claim 11 further comprising using predetermined rules to determine cause and impact of an event based on at least one out of failure rate, trend, calculated redundancy levels, manufacture performance levels and user settings.

13. A method according to claim 1 further comprising
receiving user policy settings allowing automatic correction of the SAN and
auto-correcting the SAN in response to a change in the SAN state and in dependence on the user policy settings.

14. Apparatus for determining a state of a Storage Area Network SAN comprising
a data collector to receive event and connectivity information from components of the SAN, and
a processor to analyse the event and connectivity information, to calculate a redundancy level of the SAN based on the event and connectivity information and to determine the state of the SAN based on the calculated redundancy level, wherein the state of the SAN comprises a state value that indicates an overall SAN connectivity state based, at least in part, on a lowest redundancy path of the SAN;
wherein the calculated redundancy level comprises a value in a range, a low value indicating a low path or component redundancy and a high value indicating a high path or component redundancy.

15. Apparatus according to claim 14 comprising a graphical user interface for presenting the state of the SAN to a user and for recommending actions to the user.

16. Apparatus according to claim 15, wherein the graphical user interface is configured to receive user policy settings for taking auto-corrective actions in dependence on a calculated redundancy level.

17. Apparatus according to claim 16 comprising an interface for automatically correcting a fault in the SAN in dependence on the user policy settings.

18. A method comprising
analysing data collected by a remote management station from components in a Storage Area Network (SAN) to calculate a redundancy level of the SAN, wherein the redundancy level comprises a value in a range, a low value indicating a low path or component redundancy and a high value indicating a high path or component redundancy;
determining the state of the SAN based on the calculated redundancy level, wherein the state of the SAN comprises a state value that indicates an overall SAN connectivity state based, at least in part, on a lowest redundancy path of the SAN;
determining appropriate actions to improve the state of the SAN based on the analysed data and pre-stored rules;
communicating instructions from the remote management station to at least one component in the SAN for carrying out said actions.

19. A method according to claim 18, wherein the instructions to the at least one component in the system for carrying out said actions are only communicated if user policy settings allow based on the calculated redundancy level.

* * * * *